R. W. THOMPSON.
STICK CANDY TWISTER.
APPLICATION FILED APR. 7, 1920.
1,355,018.
Patented Oct. 5, 1920.
3 SHEETS—SHEET 1.
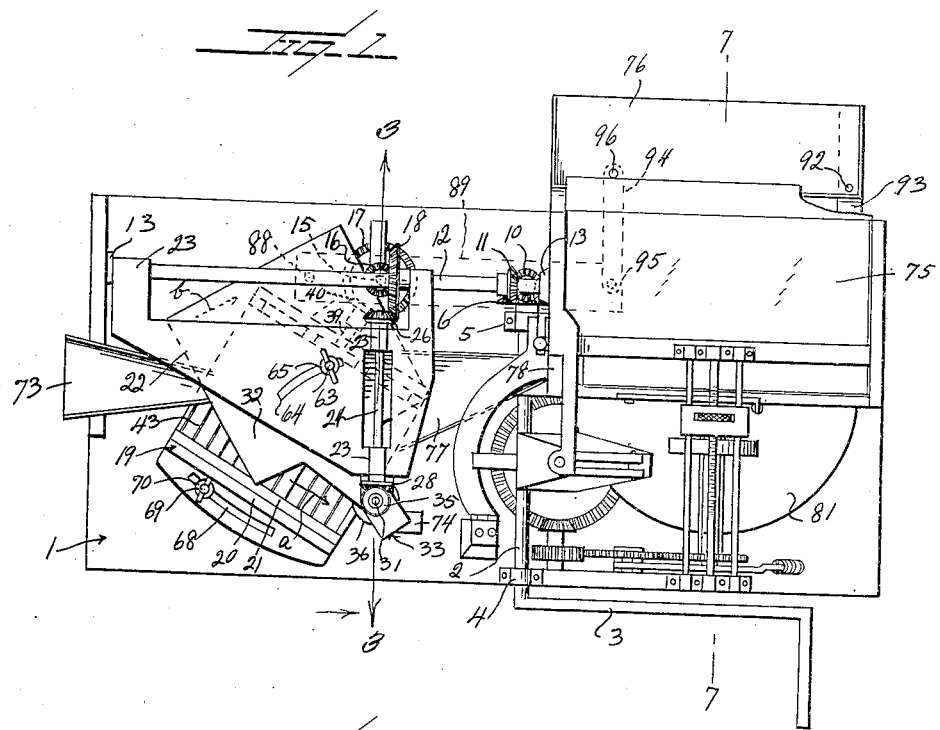
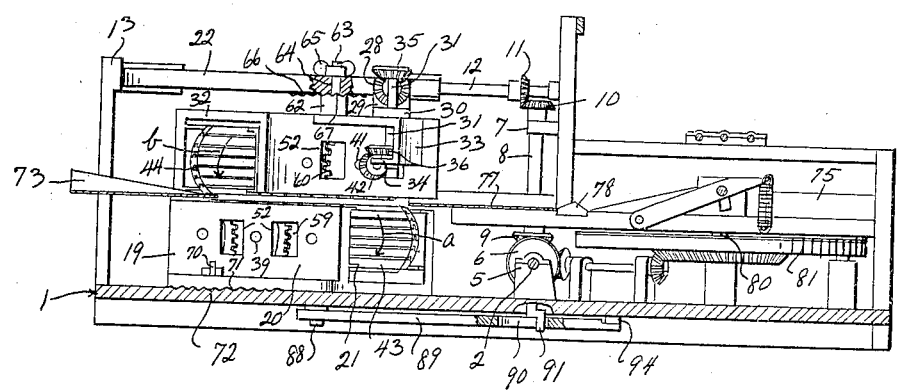
Inventor
R. W. Thompson
By Watson E. Coleman
Attorney R. W. THOMPSON.
STICK CANDY TWISTER.
APPLICATION FILED APR. 7, 1920.
1,355,018.
Patented Oct. 5, 1920.
3 SHEETS—SHEET 2.
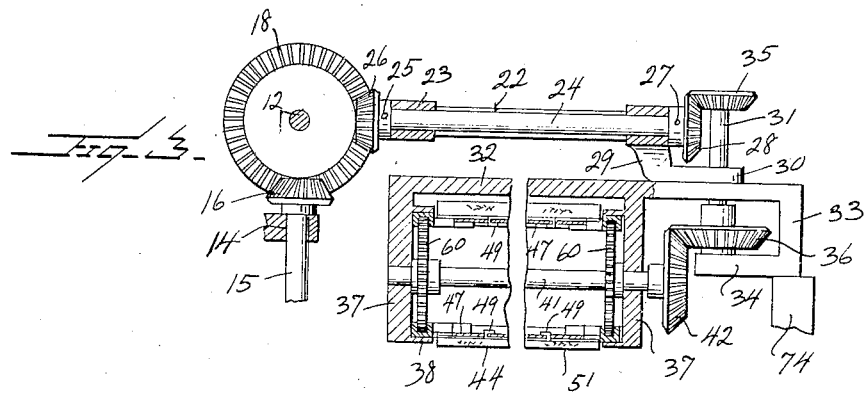
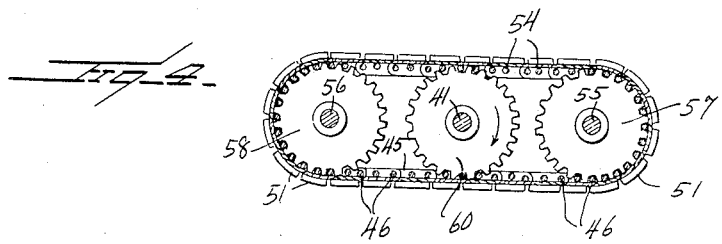
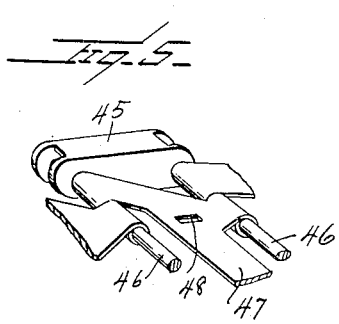
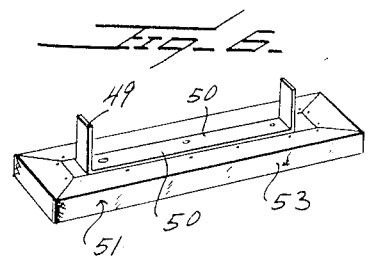
Inventor
R. W. Thompson
By Watson E. Coleman
Attorney

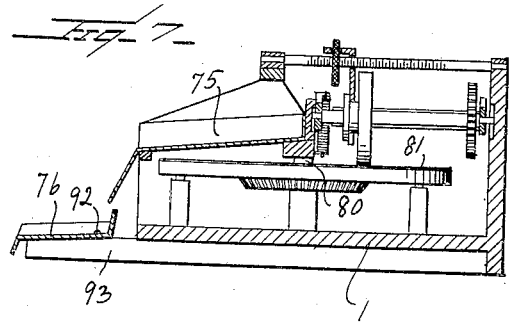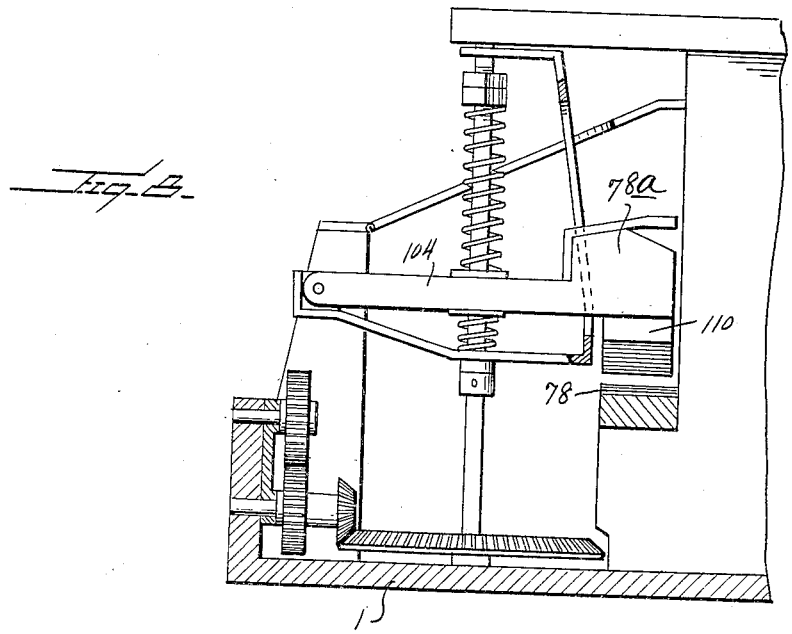

UNITED STATES PATENT OFFICE.

ROY W. THOMPSON, OF SEATTLE, WASHINGTON.

STICK-CANDY TWISTER.

1,355,018.   Specification of Letters Patent.   Patented Oct. 5, 1920.

Original application filed December 20, 1919, Serial No. 346,272. Divided and this application filed April 7, 1920. Serial No. 371,964.

*To all whom it may concern:*

Be it known that I, ROY W. THOMPSON, a citizen of the United States, residing at Seattle, in the county of King and State of Washington, have invented certain new and useful Improvements in Stick-Candy Twisters, of which the following is a specification, reference being had to the accompanying drawings.

This invention relates to the art of candy manufacture and more especially to a machine for twisting stick candy and an object of the invention resides in the reduction of the cost of producing stick candy particularly the kind which is in the form of twisted lengths.

Another object is to provide an improved candy twister mechanism especially adapted for use in connection with the stick candy cutting mechanism set forth, illustrated and claimed in the co-pending application of R. W. Thompson, filed December 20, 1919, Serial Number 346,272.

Still another object is to provide a machine to insure twisting the candy more uniformly and also embodying means for varying the twist of the candy.

A further object resides in the provision of an agitating tray or table to keep the stick candy in motion while yet warm so as to prevent the stick candy from becoming flat and from running together as well as preventing obliterating the twisted appearance. It has been found that while the sticks of candy are still warm and allowed to lay without agitation or without turning them, they will settle down or get flat to a certain extent, hence the agitation of the candy.

A still further object is to provide a machine of this kind including coöperative stick candy feed devices in the form of feed belts, it being the aim to operate the belt at the same speed and at the same angle with relation to each other, the object of which being to not only feed the candy but at the same time to impart a twist to the candy and also to keep the candy straight during the time of its passage between the combined feed belts and twister so as to pass from one guide to the other.

It is also the aim of the invention to provide an operative gearing between the combined feed belts and twisters and the driving means of the machine, which is not only efficient in every respect, but is very durably constructed and will efficiently withstand the wear by running the machine at a very rapid rate of speed.

The invention still further aims to mount the combined feeding and twisting belts so that they can be adjusted at different angles relative to each other in order to increase and decrease the twist of the stick candy so as to comply with the requirements of the different manufacturers as some prefer more twists in the candy than others.

Additionally the invention aims to mount one of the combined feeding and twisting belts so that it can be raised and lowered in order to permit of access to the coöperative faces of the belt to accommodate themselves to different diameters or thicknesses of candy.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a top plan view of the improved stick candy twisting machine constructed in accordance with the invention, also showing the cutting mechanism as applied, but briefly described for the reason that the details of the cutting mechanism are set forth and claimed in the aforesaid co-pending application, Fig. 2 is a longitudinal sectional view through the machine showing the working parts of the machine in elevation and showing a portion of the base and parts of the lever 89 broken away to show its connection with the crank 91.

Fig. 3 is a sectional view on line 3—3 of Fig. 1 showing the parts that appear in the rear eliminated, and illustrating the upper feed belt frame positioned so that the feed belt will appear in section transversely.

Fig. 4 is a sectional view through the upper feed belt,

Fig. 5 is an enlarged detail perspective view showing one of the links of the chain of the upper feed belt, showing the plates 47, Fig. 6 is a detail perspective view of one of the fabric covered slats of one of the said belts, Fig. 7 is a sectional view on line 7—7 of Fig. 1; and Fig. 8 is an enlarged detail view of a conventional form of cutting mechanism, which is set forth in detail in the said co-pending application.

Referring more especially to the drawings, 1 designates the frame of the improved machine and which may be constructed of any suitable material and of any suitable construction or configuration, preferably as shown.

Mounted in bearings of the frame and transversely disposed, is a driving shaft 2, and which may be operated by a crank 3, or may be geared to any suitable motor or operating means (not shown). The bearings for this driving shaft are designated by the numerals 4 and 5 and carried by the inner end of the shaft adjacent the bearing 5 is a bevel gear 6.

Mounted in bearings 7 of said frame and disposed perpendicularly, is a shaft 8, and fixed to its lower end is a bevel gear 9 which meshes with the bevel gear 6. The upper end of the shaft 8 has a bevel gear 10 which meshes with a bevel gear 11 which is carried by a horizontally disposed shaft 12. This shaft 12 is mounted in suitable bearings 13 of the frame and also constitutes a supporting means for a pivotally mounted frame which carries one of the combined feeding and twisting belts.

Also mounted in bearings 14 of the frame and disposed vertically, is a shaft 15, having bevel gears 16 and 17 at its upper and lower ends. The horizontally disposed shaft 12 has an additional bevel gear 18, which meshes with the upper bevel gear 16 of the vertical shaft 15.

A frame 19 is movable in a plane in parallelism with the bottom of the main frame, and this frame 19 has pivotal engagement with the vertical shaft 15, so that the frame 19 can be adjusted on an arc whose radius extends from the vertical shaft 15. The frame 19 has opposing side walls 20, and carried by the inner faces of these side walls 20 are guides 21, on which the chains of the combined twisting and feeding belts are guided.

Pivotally mounted upon the shaft 12 is a frame or plate 22, capable of being raised or lowered and mounted in bearings 23 of this plate or frame 22 is a shaft 24. One end of the shaft 24 has fixed thereto as at 25 a bevel gear 26, also meshing with the bevel gear 18. It will be noted that the bevel gear 26 will remain in mesh with the bevel gear 18 regardless of the position of the frame or plate 22, that is to say whether it is in a lowered or raised position.

The other end of the shaft 24 has secured thereto, as at 27 a bevel gear 28. Extending downwardly from one of the bearings 23 of the frame or plate 22 is an extension bracket arm 29, and the end of this bracket arm 29 constitutes a bearing 30 for a shaft 31, and also constitutes a pivot for the frame 32. The pivoted end of the frame 32 has an extension arm 33 which extends downwardly and under the frame 32, and its extremity constitutes a bearing 34 for the lower end of the shaft 31. Mounted upon the upper end of the shaft 31 is a bevel gear 35 meshing with the bevel gear 28 so that through the medium of the rotation of the shaft 24, motion is imparted to the shaft 31. The lower end of the shaft 31 carries a bevel gear 36, which transmits motion to the combined twisting and feeding belt, which is carried between the opposing walls 37 of the frame 32. The opposing walls 37 of the frame 32 have guides 38, on which the chains of the upper combined twisting and feeding belt engage. Mounted in bearings of the opposing walls 20 of the lower frame 19 is a shaft 39, provided with a bevel gear 40 at one end, meshing with the bevel gear 17 of the shaft 15.

Mounted in bearings of the opposing walls 37 of the upper frame 32 is a shaft 41 having a bevel gear 42 on one end meshing with the bevel gear 36 of the shaft 31. These shafts 39 and 41 constitute means for imparting motion to the combined twisting and feeding belts, which are designated respectively 43 and 44. Each combined feeding and twisting belt comprises link chains 45, the links of which are U-shaped in cross section, and are pivotally united by means of transverse rods 46. By means of these rods 46, the links of one chain on one side of the twisting and feeding belt are held in alinement opposite the links of the opposite chain. Furthermore, these rods 46 constitute pivot means for the plates 47, which are of the shape and construction as shown in the drawings, though not necessarily, for it is obvious that they may be of any other suitable construction so long as they pivotally connect with the rods 46. The plates 47 have slots 48, which receive the ears 49 of the metallic strips 50, which are carried by the feeding and twisting slats or sections 51 of the combined twisting and feeding belt. After passing the ears 49 through the slots 48, they are bent over, in order to secure the slats or twisting sections to the plates 47. It is obvious that these ears 49 may be manipulated so that the slats or sections may be easily detached, for repairs or for cleaning purposes. In order to accomplish this, the side walls of the respective frames 19 and 32 have openings 52, in order to permit access to the ears so that they can be bent back. After bending the ears back, the sections or slats can be easily detached. In order to impart a twist or feeding action to the stick candy, it is necessary to provide a surface on the slats or sections 51 to cause a non-slipping contact with the candy. In order to attain this result, the slats or sections are covered with suitable fabric 53. This fabric may be easily removed whenever desired so that it can be renewed, or washed, and in the latter case it may be reattached to the sections or slats. The links of each of the chains of the combined twisting and feeding belts are provided with transverse pins 54, which are of diameters corresponding to the diameters of the rods 46. These pins 54 and the ends of the rods 46 where they pass through the walls of the links constitute means to be engaged by the teeth of the sprocket wheels, which are designed for driving the chain.

It is to be noted that the combined twisting and feeding belts are designed to have preferably as many slats or sections as are shown in the drawings, though not necessarily, for it is obvious that any number of slats or sections may be employed. Each feeding and twisting belt includes means for driving it, and this means comprises the shafts 55 and 56. One set of shafts 55 and 56 is carried in bearings of the opposing walls 20 of the lower frame 19, whereas the other set 55 and 56 is mounted in bearings of the opposing walls 37. Each set of shafts 55 and 56 carry gear wheels 57 and 58, the teeth of which engage the links of the chains of the combined twisting and feeding belt, so as to impart movement thereto.

Adjacent one of the walls 20 and carried by the shaft 39 is an additional gear wheel 59, which engages the chains of the combined twisting and feeding belt. Carried by the shaft 41 and adjacent the inner face of one of the walls 37 is a sprocket wheel 60, which engages with the chains of the upper combined twisting and feeding belt.

Through the medium of the gearing mechanism above described, it will be noted how the upper and lower combined twisting and feeding belts are operated. It is the aim to dispose these combined twisting and feeding belts at intersecting angles, preferably as shown, though not necessarily, for it is obvious that the belts can be adjusted, using the shafts 15 and 31 as their pivots.

The upper frame 32 has a shouldered stud 62, the reduced end 63 of which passes upwardly through the arcuate slot 64 of the plate or frame 22. A thumb nut 65 is carried by the upper end of the reduced extension 63 so that by setting up on said thumb nut, the plate or frame 32 may be held adjusted. The under face of the plate or frame 22 is provided with a series of teeth 66 arranged on an arcuate curve concentric with the shaft 31. The shoulder of the stud 62 is provided with teeth 67 adapted to coöperate with the teeth 66 particularly when the thumb nut 65 is tightened. These coöperating teeth 66 and 67 are very shallow, and furthermore the frame 32 is sufficiently loose upon the shaft 31 as to permit the teeth 67 to disengage from the teeth 66 when the thumb nut is loosened, so as to permit the shouldered stud to move in the arcuate slot of the plate or frame 22. By virtue of the pivotal mounting of the upper frame 32, the upper combined feeding and twisting belt may be adjusted on different angles relative to the path of the stick candy, in order to increase or decrease the twist, and at the same time guide the stick candy direct through the machine, without the same feeding to one side or the other.

The lower frame or plate 19 also has an arcuate slot 68, which is concentric with the vertical shaft 15. The bottom of the main frame has an upstanding stud 69 passing through the slot 68 and has a thumb nut 70. The under face of the frame 19 has teeth 71 extending radially from the shaft 15, and are designed to engage similar teeth 72 of the upper face of the bottom of the frame 1. These teeth 71 and 72 are shallow so that the lower frame 19 may easily pass over the teeth, when it is moved on an arcuate curve concentric with the shaft 15. It will be seen that the lower combined feeding and twisting belt is capable of adjustment angularly to the plane of the path of the stick candy. In fact, while the angles of the combined twisting and feeding belts are opposite, they are designed to be of the same angles with relation to the path of the stick candy, so as to insure imparting a twisting action to the stick and at the same time holding the stick candy true to the path of travel. By the adjustment of the combined twisting and feeding belt, the twist of the stick candy can be increased or decreased as the case may be. Furthermore, by virtue of the gearing above described, it will be noted that the combined twisting and feeding belts are driven at the same relative speed, so that the twist of the candy will be uniform. The uniformity of the twist is also insured owing to the corresponding angles on which the twisting and feeding belts are arranged.

A stick candy guide 73 is mounted on the frame 1 so as to guide the stick candy toward and between the coöperative surfaces of the combined twisting and feeding belts. Owing to the upper twisting and feeding belt being capable of pivotal movement in a vertical plane (the shaft 12 constituting a pivot therefor) stick candy of different diameters may pass between the coöperating surfaces. In other words, by the pivotal action of the upper twisting and feeding belt, the coöperative surfaces of said belts may accommodate themselves to different diameters of stick candy. The arm or extension 33 rests upon the support 74, when the upper feeding and twisting belt is lowered to a horizontal position.

Mounted upon the frame 1 is a stationary guide 75 which is inclined so that as the lengths of stick candy are cut, they will roll or slide down the guide, and subsequently fall upon a shaking tray 76. A guide 77 extends from the lower combined feeding and twisting belt, and constitutes means for guiding the stick candy toward the guide 75. Positioned between the guides 75 and 77 is a chopping block or anvil 78, on which the candy is cut, after a requisite length of candy has passed upon the guide 75.

In Figs. 1 and 8 there is disclosed a stick candy cutting mechanism 78ᵃ, and which includes a cutter element 110 of the member 104 adapted to coöperate with the anvil 78. This cutting mechanism is set forth, illustrated and claimed in the co-pending application heretofore mentioned, therefore a further description of said cutting mechanism in so far as its minor details is concerned, is unnecessary, it being safe to state that while it is preferable to use this form of cutting mechanism, it is obvious that other well known forms of cutting mechanism may be employed.

In order to operate this cutting mechanism, the shaft 2 in Fig. 1 of the present case is geared with the shaft 80 and through the medium of this shaft and a train of gears shown at 81 in Fig. 1, the cutting mechanism is actuated to cut the stick candy in different lengths. Furthermore, this gear mechanism which includes the friction disk 81 of the shaft 80 is also set forth, illustrated and claimed in said co-pending application.

Pivoted at 88 to the under face of the frame 1 is a lever 89 which has a slot 90 in which a crank arm 91 of the shaft 8 engages. This crank arm cams against the longitudinal side walls of the slot 90 of the lever 89, thereby acting to impart an oscillatory movement to the lever. The shaking tray 76 is pivotally mounted at 92 upon one of the projecting arms 93 of the frame 1. The other arm 93 slidably supports the oscillating tray. A link 94 is pivotally connected at 95 to one end of the lever 89 and is in turn pivotally connected at 96 to the tray. When the shaft 8 rotates, an oscillatory movement will be imparted to the lever 89 which in turn will impart an oscillatory movement to the tray, upon which the sticks of candy fall so as to be agitated. The agitation of the sticks of candy will keep them from flattening out or running together or losing their twisted shape.

In the manufacture of stick candy with this improved twister mechanism, it is the aim to provide the candy before it is twisted with stripes, though not necessarily, for it is obvious that the plain colors of candy may be used. However, the stripes when the stick candy is twisted, will more plainly disclose the effect of the twist. Furthermore, stick candy that has an edge may be twisted with this machine and in this case, the edge will disclose the twist.

The stick candy first enters the guide 73 where it passes between the twisting and feeding belt and through the guide 77 across the anvil or chopping block, where the cutting mechanism severs the candy into lengths and then upon the guide 75. At different intervals according to the speed of the cutting knife or the severing member, the knife will coöperate with the anvil or chopping block to cut the candy in lengths. These lengths roll down the guide 75 and then upon the tray 76 where the stick candy is agitated so as to prevent it from losing its shape.

When the upper twisting and feeding belt is tilted on the shaft 12, the twisting faces of the sections of said belts may be cleaned or otherwise repaired or the sections of the bolts removed.

Stick candy, when made by the use of this improved machine can be manufactured more rapidly than can be twisted by hand, thus causing a great saving of time and labor. Furthermore, by means of this machine, a smoother and steadier twisting action can be imparted to the belt, which will transmit a more uniform twist to the candy.

It is the aim to use in connection with this twisting mechanism, an improved means or mechanism such as shown in the co-pending application for varying the speed of the cutting mechanism, in order to vary the lengths of the stick candy, and from the foregoing in connection with the drawings, it is obvious that there has been devised a very simple and improved machine of this character which can be cheaply made and sold at a reasonable profit.

In twisting the candy, the candy is passed in the machine over the guide 73 and then between the combined twisting and feed belts which are designed to move in the directions of the arrows $a$ and $b$ shown clearly in Figs. 1 and 2. In fact the lower combined feed felt and twister moves in a direction forwardly of the machine and slightly laterally to the right, while the upper combined feed belt and twister rotates forwardly and slightly laterally to the left. Owing to the two combined belts and twisters so moving, one practically laterally in one direction and the other laterally in the other direction, but both forwardly, causes the candy to twist, particularly as the main body of the candy, before it enters the guide 73, is supported against rotative movement. It is obvious that by changing the angles of the combined feed belts and twisters, the twisting of the stick candy can be varied. In other words, by moving the lower feed belt and twister so as to change the angle more to the right and the upper feed belt and twister so as to move laterally more to the left, a greater twist may be imparted to the stick candy.

The invention having been set forth, what is claimed as new and useful is:—

1. In a machine as set forth, a twisting mechanism comprising combined twisting and feeding belts having their adjacent faces operative at opposite angles, so as to impart feeding and twisting actions to the stick candy and means for varying the angle of the belts, whereby the twist of the stick candy may be increased or decreased.

2. In a machine as set forth, a twisting mechanism comprising combined twisting and feeding belts having their adjacent faces operative at opposite angles, so as to impart feeding and twisting actions to the stick candy and means for varying the angle of the belts, whereby the twist of the stick candy may be increased or decreased, one of said feeding and twisting belts comprising a supporting frame, said supporting frame being pivotally mounted and carrying one of said feeding and twisting belts, whereby it may be raised or lowered to permit access to the operative faces of both belts.

3. In a stick candy twisting machine, a twisting mechanism comprising combined feeding and twisting belts disposed in parallel planes at opposite angles to each other, whereby the adjacent faces of the belts operate at opposite angles to impart feeding and twisting actions to the stick candy, and means operatively connected to said belts for driving them at corresponding speeds.

4. In a stick candy twisting machine, a twisting mechanism comprising combined feeding and twisting belts disposed in parallel planes at opposite angles to each other, whereby the adjacent faces of the belts operate at opposite angles to impart feeding and twisting actions to the stick candy, and means operatively connected to said belts for driving them at corresponding speeds, said operating means including a driven shaft, one of said feeding and twisting belts including a supporting frame pivoted upon said shaft whereby upon raising or lowering the supporting frame, the combined feeding and twisting belt may be tilted to permit access to the adjacent operative faces of the belts.

5. In a stick candy twisting machine, a twisting mechanism comprising combined feeding and twisting belts disposed in parallel planes at opposite angles to each other, whereby the adjacent faces of the belts operate at opposite angles to impart feeding and twisting actions to the stick candy, means operatively connected to said belts for driving them at corresponding speeds, said twisting and feeding belts being pivoted to be swung in horizontal planes, and means for holding the twisting belts when adjusted in parallel horizontal planes for increasing or decreasing the twisting action of the stick candy.

6. In a machine as set forth, a stick candy twisting mechanism comprising a feed path for the stick candy, upper and lower frames pivotally and operatively mounted, one upon each side of the path of travel to the stick candy, whereby said frames may be adjusted on their pivots toward the path of travel, thereby varying the twist in the stick candy as it passes through the path of travel, and combined feed and twisting belts carried by said frames having portions moving in parallel planes, and in directions forward, one laterally to one side, the other laterally to the other side to impart a twist to the candy.

7. In a machine as set forth, a stick candy twisting mechanism comprising a feed path for the stick candy, upper and lower frames pivotally and operatively mounted, one upon each side of the path of travel to the stick candy, whereby said frames may be adjusted on their pivots toward the path of travel, thereby varying the twist in the stick candy as it passes through the path of travel, and combined feed and twisting belts carried by said frames having portions moving in parallel planes, and in directions forward, one laterally to one side, the other laterally to the other side to impart a twist to the candy, and means for holding said frames in their different adjusted positions.

8. In a machine as set forth, a supporting frame provided with a stick candy path of travel, upper and lower frames pivotally mounted upon the main frame, one upon each side of the path of travel, combined feed and twister belts carried by said frames, movable in adjacent parallel planes forwardly, one laterally toward one side, the other laterally toward the opposite side, whereby the candy as it passes through the path of travel may receive twisting actions, means operatively connecting the combined feed and twister belts, and means for operating said connecting means between the combined feed and twister belts, whereby they may move uniformly.

9. In a machine as set forth, a supporting frame provided with a stick candy path of travel, upper and lower frames pivotally mounted upon the main frame, one upon each side of the path of travel, combined feed and twister belts carried by said frames, movable in adjacent parallel planes forwardly, one laterally toward one side, the other laterally toward the opposite side, whereby the candy as it passes through the path of travel may receive twisting actions, means operatively connecting the combined feed and twister belts, and means for operating said connecting means between the combined feed and twister belts, whereby they may move uniformly, said frames carrying the belts being movable on their pivots toward the path of travel, to vary the twist of the stick candy, and means for holding said frames in different adjusted positions.

10. In a machine as set forth, a supporting frame provided with a stick candy path of travel, upper and lower frames pivotally mounted upon the main frame, one upon each side of the path of travel, combined feed and twister belts carried by said frames, movable in adjacent parallel planes forwardly, one laterally toward one side, the other laterally toward the opposite side, whereby the candy as it passes through the path of travel may receive twisting actions, means operatively connecting the combined feed and twister belts, and means for operating said connecting means between the combined feed and twister belts, whereby they may move uniformly, a mechanism operatively connecting the belts, whereby they may be moved in unison, means for actuating said mechanism for driving the belts, the upper frame being pivotally mounted so that the upper frame may be raised, for making repairs to the two belts or disassembling them, or for arranging the stick candy between them.

11. In a machine as set forth, a main frame including a path of travel for the stick candy, oscillatory frames pivotally mounted upon the frame, one upon each side of the path of travel, combined feed and twister means carried by said oscillatory frames and having their adjacent faces movable in parallel planes and at opposite angles, means operatively connecting the twister means, a pivoted frame carrying one of said oscillatory frames, whereby the combined feed and twister means thereof may be separated from the other twister and said means, and a mechanism for transmitting power to the operative connections between the feed and twister means for actuating them both regardless whether or not their frames are being adjusted or whether or not one of the frames is being raised.

In testimony whereof I hereunto affix my signature.

ROY W. THOMPSON.